United States Patent
Lin et al.

(10) Patent No.: US 7,694,107 B2
(45) Date of Patent: Apr. 6, 2010

(54) DYNAMIC PERFORMANCE RATIO PROPORTIONATE DISTRIBUTION OF THREADS WITH EVENLY DIVIDED WORKLOAD BY HOMOGENEOUS ALGORITHM TO HETEROGENEOUS COMPUTING UNITS

(75) Inventors: Hsin-Ying Lin, Richardson, TX (US); Jianwei Dian, Plano, TX (US); Kirby L. Collins, Anna, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 11/207,047

(22) Filed: Aug. 18, 2005

(65) Prior Publication Data

US 2007/0067606 A1   Mar. 22, 2007

(51) Int. Cl.
  G06F 15/16   (2006.01)
(52) U.S. Cl. ............... 712/28; 718/104; 718/105
(58) Field of Classification Search .............. None
  See application file for complete search history.

(56) References Cited

U.S. PATENT DOCUMENTS

| | | | | |
|---|---|---|---|---|
| 5,522,070 A | * | 5/1996 | Sumimoto | 718/104 |
| 5,978,831 A | * | 11/1999 | Ahamed et al. | 718/105 |
| 6,304,866 B1 | * | 10/2001 | Chow et al. | 707/2 |
| 6,539,542 B1 | * | 3/2003 | Cousins et al. | 717/151 |
| 6,799,317 B1 | * | 9/2004 | Heywood et al. | 719/313 |
| 6,907,099 B2 | * | 6/2005 | Kling et al. | 378/4 |
| 6,950,848 B1 | * | 9/2005 | Yousefi'zadeh | 709/203 |
| 6,957,424 B2 | * | 10/2005 | Stecher | 717/151 |
| 7,027,514 B2 | * | 4/2006 | Li et al. | 375/240.25 |
| 7,085,694 B2 | * | 8/2006 | Xavier et al. | 703/7 |
| 7,574,708 B2 | * | 8/2009 | Chung et al. | 718/104 |
| 2002/0198924 A1 | * | 12/2002 | Akashi et al. | 709/102 |
| 2003/0005068 A1 | * | 1/2003 | Nickel et al. | 709/208 |
| 2004/0216114 A1 | * | 10/2004 | Lin | 718/105 |
| 2005/0081181 A1 | | 4/2005 | Brokenshire et al. | 717/100 |
| 2005/0114429 A1 | | 5/2005 | Caccavale | 709/200 |
| 2006/0031695 A1 | * | 2/2006 | Isozaki et al. | 713/375 |
| 2006/0123251 A1 | * | 6/2006 | Nakajima et al. | 713/300 |

* cited by examiner

Primary Examiner—Kenneth S Kim

(57) ABSTRACT

In at least some embodiments, a system, comprises a first computing unit having a first type of processors. The system further comprises a second computing unit having a second type of processors, the second computing unit being coupled to the first computing unit. The first and second computing units are configured to provide parallel processing of an application based on an algorithm that distributes work evenly to a plurality of threads. The number of the threads assigned to each of the first and second computing units is based on a number of processors associated with each of the first and second computing units and a per-processor performance of the first and second computing units.

13 Claims, 4 Drawing Sheets

DYNAMIC PERFORMANCE RATIO PROPORTIONATE DISTRIBUTION OF THREADS WITH EVENLY DIVIDED WORKLOAD BY HOMOGENEOUS ALGORITHM TO HETEROGENEOUS COMPUTING UNITS

BACKGROUND

There are different types of parallel applications. For example, computationally intensive applications (i.e., the application directs a processor to perform computational operations) are one type of parallel applications.

Parallel processing can be performed by two categories of systems. A "homogeneous" system implements one or more computers having the same type of processor and a "heterogeneous" system implements one or more computers having at least two types of processors (e.g., two different homogeneous systems may be combined to create a heterogeneous system). In either case, the parallel execution of an application workload by a plurality of processors improves system performance if the time needed to distribute and execute the workload for a plurality of parallel processors is less than the time needed to execute the workload for a single processor.

New or changing heterogeneous systems may be created over time. For example, an organization may purchase a computer having a first type of processor at one time, and at a later time, purchase another computer having a second type of processor. The organization may dynamically choose to configure the two computers to process applications as separate systems or to process applications as a heterogeneous system. In heterogeneous systems, efficiently distributing application workloads for parallel processing becomes more complicated due to the different capabilities of processors. For example, distributing the same amount of work to different processors of a heterogeneous system may result in under-utilization of some of the processors (e.g., the faster processor may be under-utilized). The under-utilization of processors reduces the performance of parallel processing.

To address this issue, at least some applications that are run on heterogeneous systems implement algorithms that assign more work to the thread of a faster processor. However, the time, cost and effort needed to design, test and implement such algorithms for new or changing heterogeneous systems are undesirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "thread" is intended to mean a single sequence of instructions that are executable in parallel with other sequences. For example, a software program may be split into two or more simultaneously running threads using time slicing or multi-processing.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to methods and systems that improve parallel processing performance in a heterogeneous computing system (i.e., a computing system comprising processors with different performance capabilities due to clocking speed or to system features such as registers, cache size, latency and bandwidth). In at least some embodiments, the performance of each processor is calculated or estimated while executing an application. Thereafter, each processor is assigned a number of threads, each thread having substantially the same amount of work assigned thereto. The number of threads assigned to each processor corresponds to each processor's calculated performance.

Figure 1:
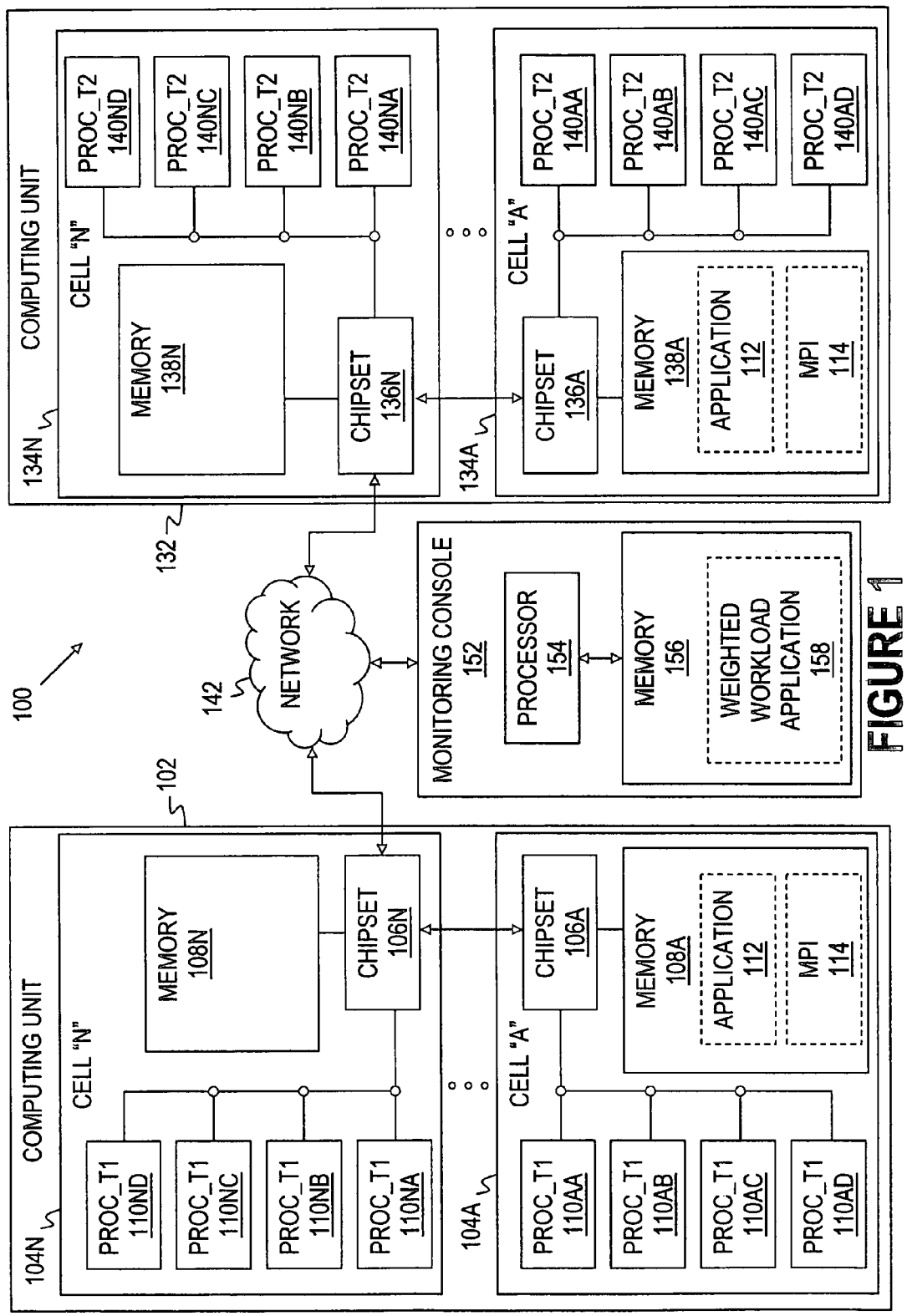
FIG. 1 shows a parallel processing system in accordance with embodiments of the invention.

FIG. 1 shows a parallel processing system 100 in accordance with embodiments of the invention. As shown in FIG. 1, the system 100 comprises a first computing unit 102 coupled to a second computing unit 132 via a network 142. The network 142 may be, for example, a local area network (LAN), an internet connection or a local connection.

The first computing unit 102 comprises a plurality of processing cells 104A-104N. As shown, each cell 104A-104N comprises a plurality of processors that couple to a memory via a chipset. For example, in the cell 104A, the processors 110AA, 110AB, 110AC and 110AD couple to the memory 108A via the chipset 106A. Likewise, in the cell 104N, the processors 110NA, 110NB, 110NC and 110ND couple to the memory 108N via the chipset 106N. The processors of the first computing unit 102 are a first type of processor ("T1").

The second computing unit 132 also comprises a plurality of processing cells 104A-104N. Again, each cell 134A-134N comprises a plurality of processors that couple to a memory via a chipset. For example, in the cell 134A, the processors 140AA, 140AB, 140AC and 140AD couple to the memory 138A via the chipset 136A. Likewise, in the cell 134N, the processors 140NA, 140NB, 140NC and 140ND couple to the memory 138N via the chipset 136N. The processors of the second computing unit 132 are a second type of processor ("T2"). Because the first computing unit 102 and the second computing unit 132 implement different types of processors (T1 and T2), the parallel processing system 100 is a heterogeneous system.

As shown, the system 100 also comprises a monitoring console 152 that couples to the computing units 102 and 132 via the network 142. The monitoring console 152 comprises a processor 154 and a memory 156 that stores a weighted workload application 158. The weighted workload application 158 is configured to increase the performance of parallel processing provided by the computing units 102 and 132. In at least some embodiments, the weighted workload application 158 increases the efficiency of the computing units 102 and 132 by comparing the performance of the different processor types (T1 and T2) and assigning different workloads (e.g., amounts of application threads) to the computing units 102 and 132 as will later be described.

Although the system 100 shows that the monitoring unit 152 stores and executes the weighted workload application 158, some embodiments may store and execute the weighted workload application 158 in one of the computing units 102 and 132. Thus, the weighted workload application 158 may be stored and executed by any available storage medium and processor of the parallel processing system 100.

Figure 2:
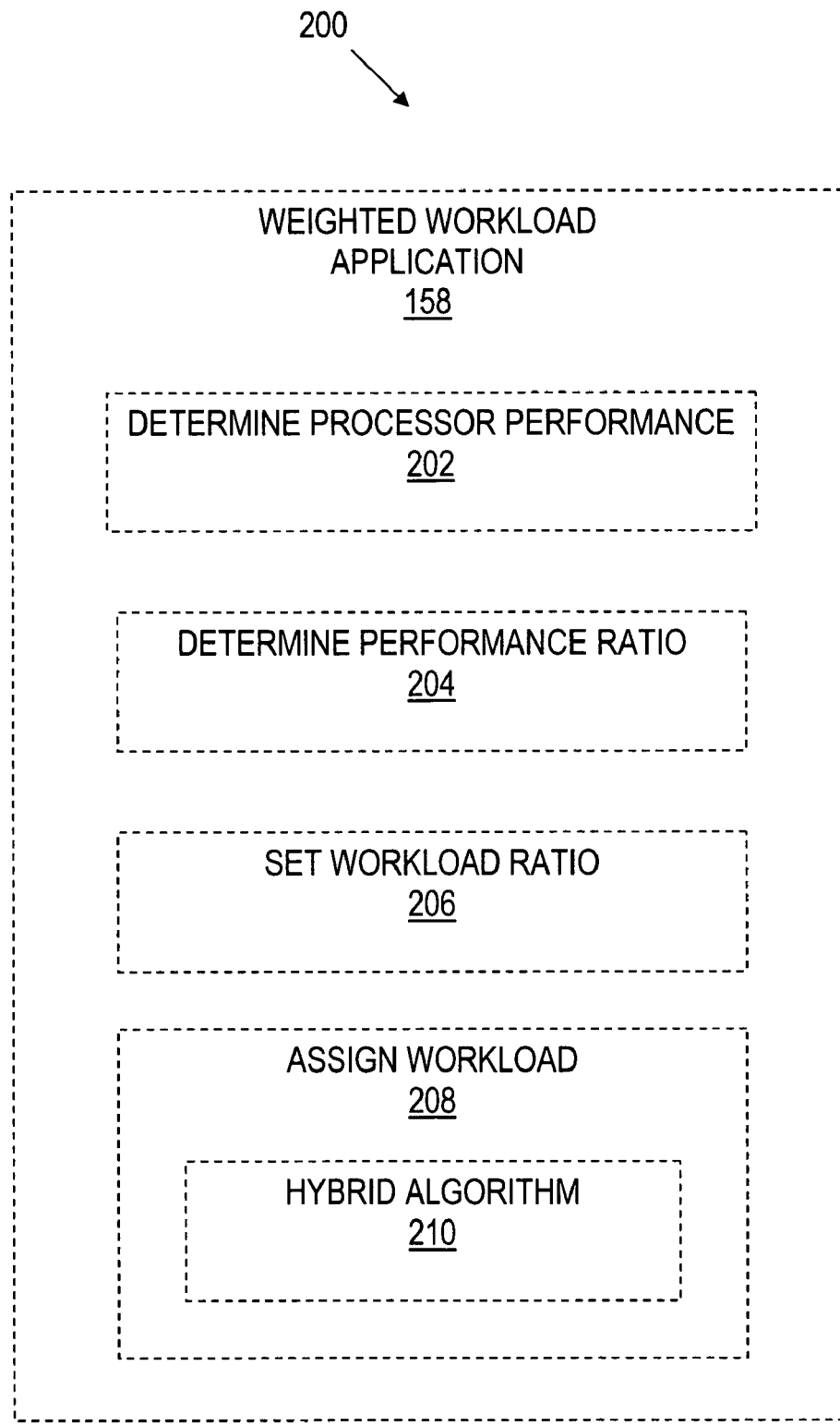
FIG. 2 shows a block diagram of a weighted workload application in accordance with embodiments of the invention.

FIG. 2 shows a block diagram 200 of the weighted workload application 158 in accordance with embodiments of the invention. As shown in FIG. 2, the weighted workload application 158 comprises determine processor performance instructions 202, determine performance ratio instructions 204, set workload ratio instructions 206 and assign workload instructions 208.

When executed, the determine processor performance instructions 202 cause an application 112 to be executed separately by each of the computing units 102 and 132. The application 112 may be stored separately in each of the computing units 102 and 132 (e.g., the application 112 may be stored in the memory 108A of the processing cell 104A and in the memory 138A of the processing cell 134A). Each of the computing units 102 and 132 executes the application 112 using a parallel processing algorithm that distributes application threads to the computing unit's processors (i.e., the computing unit 102 distributes application threads to the processors of the cells 104A-104N and the computing unit 132 distributes application threads to the processors of the cells 134A-134N).

By executing the application 112 on each of the computing units 102 and 132, performance parameters of the computing units 102 and 132, the processing cells and/or the processors are determined. In some embodiments, the determine processor performance instructions 202 cause information (specific to each computing unit) to be collected (or calculated) such as a computing unit ID (identification), a processor type, a number of CPUs, a computing unit performance, a per-processor performance or other information. The Table 1 shown below illustrates an example of information that is collected by executing the determine processor performance instructions 202. The exemplary information in Table 1 is based on existing Hewlett-Packard (HP) computing units (an HP "Madison" and an HP "PA8700") executing the "Linpack" benchmark as the application 112.

As shown in Table 1, the determine processor performance instructions 202 may cause a computing unit ID, a processor type, a number of CPUs, a computer unit performance, and a per-processor performance to be identified (or calculated) for each of the computing units 102 and 132. For example, the computing unit 102 is identified by the name "Madison." Additionally or alternatively, the computing unit 102 may be identified by a serial number, a network address or other identifiers. The processor type of the computing unit 102 is identified by the name "Itanium." Additionally or alternatively, the processor type may be identified by a processor type serial number or other identifiers. The number of processors (CPUs) associated with the computing unit 102 is identified as 64. When executing the Linpack benchmark as the application 112, the total performance of a 64-processor Madison computer is measured to be 275.42 Giga-Floating Point Operations per Second (GFlop/s). The per-processor performance of the 64-processor Madison computer is calculated by dividing the total performance by the number of processors involved (i.e., 275.42/64=4.303 GFlop/s).

As shown in Table 1, the computing unit 132 is identified by the name "PA8700." As previously mentioned for the computing unit 102, the computing unit 132 may additionally or alternatively be identified by a serial number, a network address or other identifiers. The processor type of the computing unit 132 is identified by the name "PA-RISC." Again, the processor type may additionally or alternatively be identified by a processor type serial number or other identifiers. The number of processors (CPUs) associated with the computing unit 132 is identified as 32. When executing the Linpack benchmark as the application 112, the total performance of a 32-processor PA8700 computer is measured to be 68.77 GFlop/s. The per-processor performance of the 32-processor PA8700 computer is calculated by dividing the total performance by the number of processors involved (i.e., 68.77/32=2.149 GFlop/s).

When executed, the determine performance ratio instructions 204 compares the per-processor performance of the computing units 102 and 132 to calculate a ratio. In at least some embodiments, the lowest per-processor performance value is used as the base of the ratio calculation. For example, if the per-processor performance values of Table 1 are used, the determine performance ratio instructions 204 calculate a performance ratio of 4.303/2.149=2.002 (i.e., each processor of the computing unit 102 has approximately twice the performance of each processor of the computing unit 132 when executing the application 112).

When executed, the set workload ratio instructions 206 sets a workload ratio for the computing units 102 and 132. In at least some embodiments, the set workload ratio instructions 206 determines a number of threads to be assigned to each processor of the computing units 102 and 132 based on the performance ratio described above. Also, the set workload ratio instructions 206 may cause the performance ratio to be rounded to the nearest integer. For example, if the per-processor performance values of Table 1 are used, the set work-

TABLE 1

| Computing Unit (FIG. 1) | Computing Unit ID | Processor Type | Number of CPUs | Computing Unit Performance (GFlop/s) | Per-processor performance (GFlop/s) |
|---|---|---|---|---|---|
| 102 | Madison | Itanium | 64 | 275.42 | 4.303 |
| 132 | PA8700 | PA-RISC | 32 | 68.77 | 2.149 | load ratio instructions 206 would round the performance ratio 4.303/2.149=2.002 to the integer ratio 2 or 2-to-1. Thereafter, the set workload ratio instructions 206 sets a number of threads to be assigned to each processor based on the rounded integer ratio (i.e., the processors of the computing unit 102 would be set to receive twice as many threads as the processors of the computing unit 132).

When executed, the assign workload instructions 208 cause a workload of the application 112 to be assigned to the processors of the computing units 102 and 132 based on the integer ratio described above. In at least some embodiments, assigning the workload is accomplished by assigning the same amount of work to each of a plurality of application threads (e.g., using a homogenous algorithm) and by assigning different amounts of threads to each processor based on the integer ratio. Thus, in the example of Table 1, two threads are assigned to each "Itanium" processor of the computing unit 102 for every thread assigned to each "PA-RISC" processor of the computing unit 132.

In some embodiments, the assign workload instructions 208 assign a number of threads to each of the computing units 102 and 132 based on the workload ratio and a predetermined number of processors associated with each computing unit. Each computing unit is then able to distribute the threads to the computing unit's processors using an operating system or other programming. By assigning the workload in this manner, the heterogeneous system 100 is able to improve parallel processing performance (at least while executing the application 112) without the use of algorithms that change the amount of work assigned to each thread.

Although the theoretical performance of different processors in the heterogeneous system 100 is known, the weighted workload application 158 measures the performance of these different processors as the application 112 is executed by the computing systems 102 and 132. Measuring performance of the different processors as the application 112 is executed by a particular system provides a more accurate performance measurement (i.e., more accurate than a theoretical performance) because each processor type does not reach the same efficiency when executing the application 112. This is due to the design of the processor and each computing unit.

For example, due to differences related to registers, cache sizes, latency and bandwidth, an Itanium processor of an HP Madison system can reach a higher percentage of its theoretical performance when executing the Linpack benchmark than a PA-RISC processor of an HP PA8700 system. Likewise, other applications executed as the application 112 may cause the different processors of the computing units 102 and 132 to perform at different levels of efficiency. Thus, the weighted workload application 158 distributes workload based on a measurement of each processor's actual performance when executing the application 112 as part of a particular computing unit.

When executing an application, the heterogeneous system 100 is configured to perform two levels of thread distribution. The first level of thread distribution occurs at the network level (i.e., the workload is distributed to either the computing unit 102 or the computing unit 132). The second level of thread distribution occurs as the workload assigned to each of the computing units 102 and 132 is further distributed to multiple processors within each computing unit. By distributing the workload in this manner, the performance of the heterogeneous processing system 100 is improved without the cost, time and effort needed to design, test and implement algorithms that allocate more work to threads of a faster processor.

In at least some embodiments, the computing units 102 and 132 are Symmetric Multi-Processor machines (SMPs) and are configured for parallel processing. As shown, each of the computing units 102 and 132 stores and executes a Message Passing Interface (MPI) 114. Each MPI 114 is used to create application threads (e.g., threads of the application 112 or other applications). Also, each MPI 114 enables threads to communicate with each other. An MPI 114 may be used to manage threads for both levels of thread distribution previously described (e.g., a network level and a computing unit level). Some computing units (e.g., SMPs) enable threads to share memory and thus provide a communication interface between threads that is more efficient than message passing. However, utilization of the shared memory is limited to processors on an SMP.

In at least some embodiments, the assign workload instructions 208 implement a "hybrid" algorithm 210 that uses message passing to communicate between nodes (e.g., between the computing units 102 and 132) and uses shared memory to communicate between groups of threads that are on the same node or computing unit. In alternative embodiments, the assign workload instructions 208 implement a "pure-MPI" algorithm that distributes MPI processes without taking shared memories into account. Both the hybrid algorithm and the pure-MPI algorithm are examples of homogeneous algorithms that distribute the same amount of work to each thread even though different amounts of threads may be created.

The Table 2 shown below illustrates an example of workload assignments performed by executing the weighted workload application 158. The information in Table 2 assumes that the computing unit 102 implements Itanium processors and the computing unit 132 implements PA-RISC processors as shown for Table 1. However, alternative embodiments may implement other existing and/or future processors. The information in Table 2 also assumes that the Linpack benchmark is executed as the application 112. In such case, the weighted workload application 158 determines that two threads should be assigned to each Itanium processor for every thread assigned to each PA-RISC processor.

TABLE 2

| System | Itanium CPUs (Unit 102) | PA-RISK CPUs (Unit 132) | MPI threads on Unit 102 | MPI threads on Unit 132 | SMP threads | Workload on Unit 102 | Workload on Unit 132 |
|---|---|---|---|---|---|---|---|
| A | 64 | 32 | 4 | 1 | 32 | 4/5 | 1/5 |
| B | 32 | 32 | 2 | 1 | 32 | 2/3 | 1/3 |
| C | 16 | 32 | 1 | 1 | 32 | 1/2 | 1/2 |
| D | 8 | 32 | 1 | 2 | 16 | 1/3 | 2/3 |

Table 2 illustrates a workload assignment provided by the weighted workload application 158 to four possible heterogeneous processing systems "A," "B," "C" and "D." The workload assignment illustrates using the hybrid algorithm 210 to assign a number of MPI processes to each node or each computing unit of a heterogeneous system. The hybrid algorithm 210 also assigns a number of SMP threads to each MPI process.

As shown, the system A comprises the computing unit 102 having 64 Itanium CPUs and the computing unit 102 having 32 PA-RISC CPUs. For system A, 4 MPI processes are assigned to the computing unit 102 and 1 MPI process is assigned to the computing unit 132. Also, 32 SMP threads are assigned to each MPI process. Thus, each PA-RISC CPU is assigned to execute one SMP thread and each Itanium CPU is assigned to execute two SMP threads (following the 2-to-1 workload ratio described above). In the system A, the computing unit 102 performs 4/5 of the application workload and the computing unit 132 performs 1/5 of the application workload.

As shown, the system B comprises the computing unit 102 having 32 Itanium CPUs and the computing unit 102 having 32 PA-RISC CPUs. For the system B, 2 MPI processes are assigned to the computing unit 102 and 1 MPI process is assigned to the computing unit 132. Also, 32 SMP threads are assigned to each MPI process. In this manner, each PA-RISC CPU is assigned to execute one SMP thread and each Itanium CPU is assigned to execute two SMP threads. In the system B, the computing unit 102 performs 2/3 of the application workload and the computing unit 132 performs 1/3 of the application workload.

As shown, the system C comprises the computing unit 102 having 16 Itanium CPUs and the computing unit 102 having 32 PA-RISC CPUs. For the system C, 1 MPI process is assigned to the computing unit 102 and 1 MPI process is assigned to the computing unit 132. Again, 32 SMP threads are assigned to each MPI process. Again, each PA-RISC CPU is assigned to execute one SMP thread and each Itanium CPU is assigned to execute two SMP threads. In the system C, the computing unit 102 performs 1/2 of the application workload and the computing unit 132 performs 1/2 of the application workload.

As shown, the system D comprises the computing unit 102 having 8 Itanium CPUs and the computing unit 102 having 32 PA-RISC CPUs. For the system D, 1 MPI process is assigned to the computing unit 102 and 2 MPI processes are assigned to the computing unit 132. For system D, 16 SMP threads are assigned to each MPI process rather than 32 SMP threads. Thus, system D illustrates that both the number of MPI processes and the number of SMP threads assigned to each MPI process may be adjusted so that each PA-RISC CPU is assigned to execute one SMP thread and each Itanium CPU is assigned to execute two SMP threads. In the system D, the computing unit 102 performs 1/3 of the application workload and the computing unit 132 performs 2/3 of the application workload.

While the Table 2 illustrates workload assignments for four possible systems, other workload assignments are possible. As previously discussed, workload assignments may differ based on a ratio or rounded ratio of a per-processor performance calculation. In some embodiments, the per-processor performance calculation is related to execution of a particular application (e.g., the application 112 or a "benchmark" application). In alternative embodiments, the per-processor performance calculation is based on execution of an application that is predetermined to be similar to the benchmark application. Such applications may be predetermined to utilize certain types of processor operations (e.g., computation operations, communication operations or other operations) more than others.

For example, the Linpack benchmark is considered to be a computational application. Therefore, the weighted workload application 158 may rely on the results of the per-processor performance calculation of the Linpack benchmark to assign the workloads of other applications that are predetermined to be computational in nature. In some embodiments, applications that are known to request processors to perform more than a threshold percentage (e.g., 75%) of computational operations are considered to be computational applications.

While the embodiments of FIGS. 1 and 2 illustrate a weighted workload application 158 configured to automatically assign application workloads to the heterogeneous system 100, alternative embodiments may involve some user-interaction. For example, the weighted workload application 158 may simply determine the performance ratio (or integer ratio) of processor types of the system 100. Thereafter, a user is able to assign workloads to the computing systems 102 and 132 accordingly. Also, a user may grant or deny permission before workload assignments are changed from one assignment to another.

Also, while the embodiment of FIG. 1 illustrates a heterogeneous system 100 comprising two computing units 102 and 132, other embodiments may comprise any suitable number of computing units. The computing units of a heterogeneous system are configured to perform parallel processing of a workload, the workload being able to be divided into portions that are executable in parallel. As previously described, the computing units may comprise SMPs that communicate with each other using one or both of a message passing interface (e.g., the MPI 114) and a shared memory interface (e.g., the processors of the cell 104A share the memory 108A).

Figure 3:
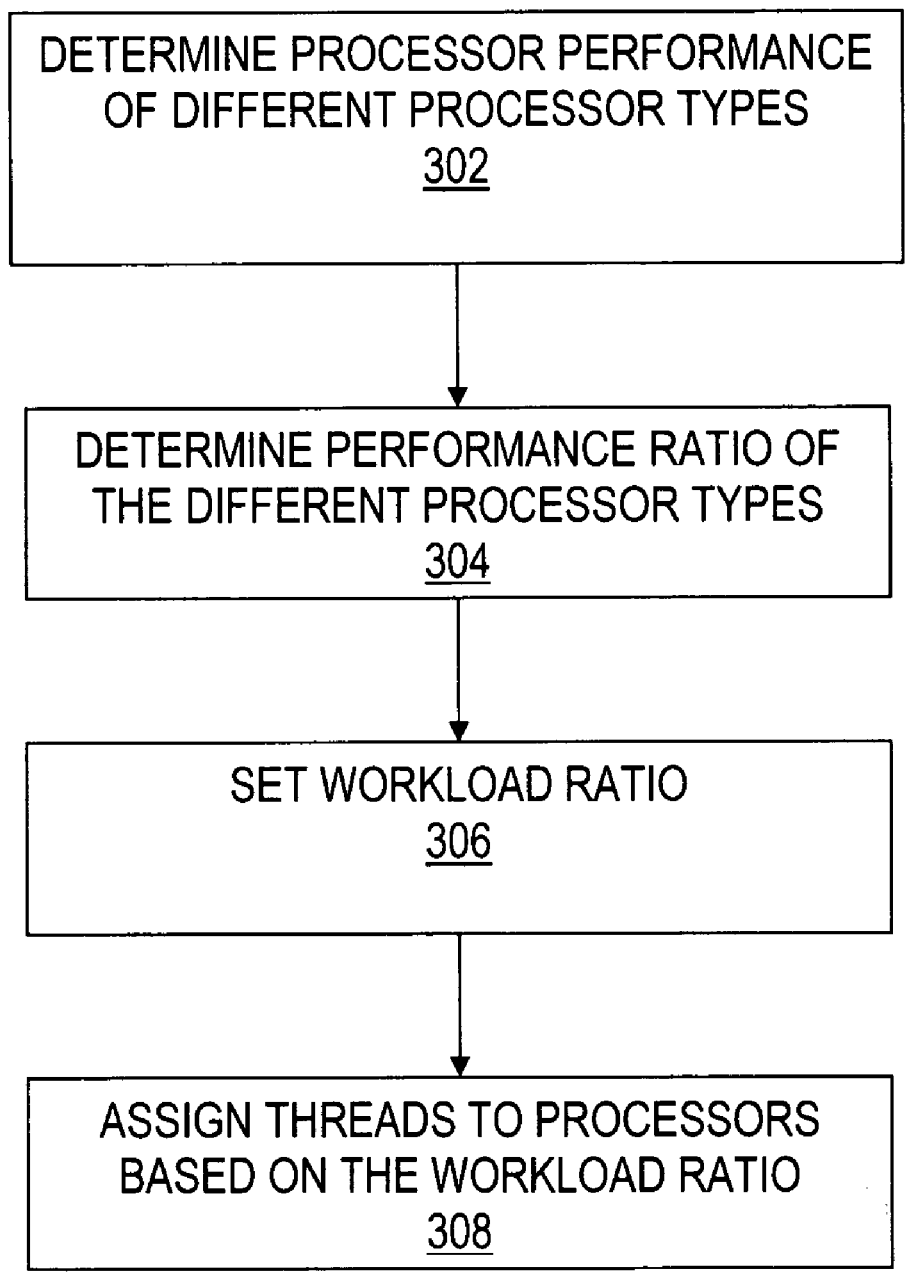
FIG. 3 shows a method in accordance with embodiments of the invention.

FIG. 3 shows a method 300 in accordance with embodiments of the invention. As shown in FIG. 3, the method 300 comprises determining a processor performance of different processor types (block 302). For example, in a heterogeneous system there may be two or more processor types. In some embodiments, the processor performance is specific to an application that is executed. Also, the processor performance may be determined by dividing a computing unit's (e.g., an SMP) performance by the number of processors involved resulting in a per-processor performance calculation. The method 300 continues by determining a performance ratio of the different processor types (block 304). The performance ratio is determined by using the performance calculation (e.g., GFlop/s) of the lowest performing processor or processor type as the base of the ratio. Thus, the performance calculation of all other processors or processor types is compared to the performance calculation of the lowest performing processor or processor type (e.g., using the information in Table 1, the performance ratio of two processor types was determined to be 4.303/2.149=2.002).

At block 306, a workload ratio is set. In some embodiments, the workload ratio is set based on the performance ratio. For example, if the performance ratio of two processors or processor types is determined to be 2.002, the workload ratio is rounded to the nearest integer ratio 2 (or 2-to-1). At block 308, the method 300 assigns threads to processors based on the workload ratio. For example, if the workload ratio of a first processor compared to a second processor is determined to be 2-to-1, the first processor is assigned to receive twice as many threads as the second processor. Alternatively, the method 300 assigns threads to a computing unit based on the workload ratio and the number of processors associated with the computing unit.

Figure 4:
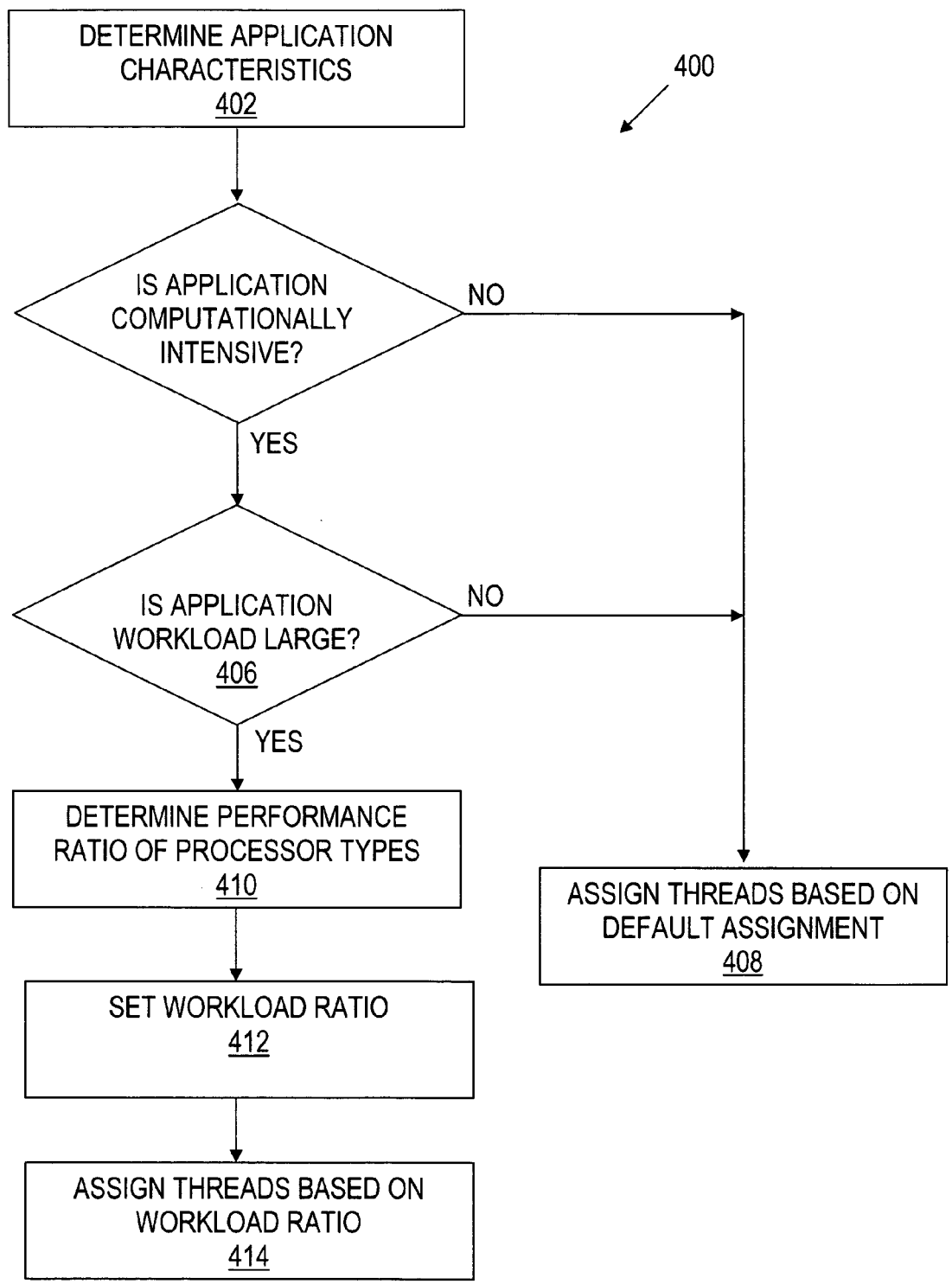
FIG. 4 shows another method in accordance with alternative embodiments of the invention.

FIG. 4 shows another method 400 in accordance with alternative embodiments of the invention. As shown in FIG. 4, the method 400 comprises determining application characteristics (block 402). For example, an application may be determined to be computationally intensive if a threshold percentage of processor operations requested by an application involve computational operations (as opposed to communication operations such as sending and receiving data). If the nature of an application in unknown, preliminary tests may be performed to determine the percentage of computational operations requested by the application whose nature in unknown. Additionally or alternatively, the application may be determined to have a large workload size (e.g., a large computational problem). For example, workload size can be determined by checking the problem size and the complexity of the problem. In some cases, the complexity of problem is a function of the problem size.

If the application is not determined to be computationally intensive (determination block 404), the method 400 assigns threads based on a default thread assignment (block 408). For example, the default assignment may assign threads equally to all processors involved in parallel processing. Also, if the application workload size is not determined to be large (determination block 406), the method 400 assigns threads based on the default thread assignment (block 408).

If the application is determined to be computationally intensive (determination block 404) and the application workload size is determined to be large (determination block 406), the method 400 determines a performance ratio of different processor types (block 410). As described above, the performance ratio may be calculated by measuring performance parameters (e.g., GFlop/s) of different processor types (e.g., processors on different computing units). The performance parameters may be obtained by executing a specific application. Also, the performance parameters obtained by executing one application may be assumed to be similar to the performance parameters of another untested application. Thereafter, the performance parameters are compared as a performance ratio (e.g., higher performance measurement/lower performance measurement). At block 412, a workload ratio of the different processor types is set. The workload ratio may be based on rounding the performance ratio to the nearest integer.

Finally, application threads are assigned to different processors, processor types or computing units based on the workload ratio (block 414). The method 400 enables a heterogeneous system to perform parallel processing efficiently based on homogeneous parallel processing algorithms (e.g., pure-MPI or hybrid algorithms) that divide work substantially equally between threads (e.g., MPI threads and/or SMP threads). Based on the method 400, the performance of a heterogeneous processing system is improved based on homogeneous algorithms (i.e., the cost, time and effort needed to design, test and implement heterogeneous algorithms that allocate more work to threads of a faster processor is avoided).

The above discussion is meant to be illustrative of the principles and various embodiments of the present invention. Numerous variations and modifications will become apparent to those skilled in the art once the above disclosure is fully appreciated. For example, the embodiment of FIG. 1 illustrates separate computing units having one type of processor. However, computing units having a single processor or multiple types of processors are possible. Thus, a heterogeneous system in accordance with embodiments of the invention may comprise a mixture of computing units having a single processor, computing units having a plurality of symmetric processors, and computing units having a plurality of different processor types. The computing units are configured to perform parallel processing of an application based on a weighted workload as previously described. It is intended that the following claims be interpreted to embrace all such variations and modifications.

What is claimed is:

1. A heterogeneous parallel processing system, comprising:
   a first computing unit having a first type of processors; and
   a second computing unit having a second type of processors, the second computing unit being coupled to the first computing unit,
   wherein the first and second computing units are configured to provide parallel processing of an application based on a homogeneous algorithm that distributes work evenly to a plurality of threads, and
   wherein a number of the threads assigned to each of the first and second computing units is based on a per-processor performance of each of the first and second computing units and a number of processors associated with each of the first and second computing units.

2. The heterogeneous parallel processing system of claim 1 wherein the per-processor performance of each of the computing units is determined while executing the application by each of the first and second computing units.

3. The heterogeneous parallel processing system of claim 1 wherein the per-processor performance of each of the computing units is determined while executing another application by each of the first and second computing units.

4. The heterogeneous parallel processing system of claim 1 wherein the homogeneous algorithm uses a message passing interface (MPI) to assign the threads to each of the first and second computing units.

5. The heterogeneous parallel processing system of claim 1 wherein the homogeneous algorithm uses a message passing interface (MPI) and a shared memory interface to assign the threads to each of the first and second computing units.

6. The heterogeneous parallel processing system of claim 1 wherein at least one of the first and second computing units comprise a Symmetric Multi-Processor (SMP) machine.

7. The heterogeneous parallel processing system of claim 1 wherein the per-processor performance of each the first and second computing units comprise a higher per-processor performance and a lower per-processor performance, wherein the number of threads assigned to each of the first and second computing units is determined by a ratio of the higher per-processor performance over the lower per-processor performance.

8. The heterogeneous parallel processing system of claim 7 wherein the ratio is rounded to the nearest integer.

9. A digital storage medium storing computer-readable instructions that, when executed, cause a heterogeneous computer system to:
   dynamically determine a performance ratio of a first type of processor and a second type of processor;
   prepare a plurality of threads using a homogeneous algorithm that divides an application workload evenly between the plurality of threads; and
   distribute different quantities of threads to the first type of processor and the second type of processor, the different quantities of threads being based on the performance ratio.

10. The digital storage medium of claim 9, wherein the computer-readable instructions, when executed, cause the heterogeneous computer system to determine the performance ratio based on executing a predetermined application.

11. The digital storage medium of claim 9, wherein the computer-readable instructions, when executed, cause the heterogeneous computer system to prepare the plurality of threads using a homogeneous algorithm that uses a message passing interface (MPI) for parallel processing.

12. The digital storage medium of claim 9, wherein the computer-readable instructions, when executed, cause the heterogeneous computer system to prepare the plurality of threads using a homogeneous algorithm that uses a message passing interface (MPI) and a shared memory interface for parallel processing.

13. A heterogeneous parallel processing system, comprising:
- means for dynamically determining an application-specific performance ratio of a first type of processor and a second type of processor;
- means for dividing an application workload evenly between a plurality of threads; and
- means for assigning different quantities of threads to the first type of processor and the second type of processor, the different quantities of threads being based on the performance ratio.

* * * * *